Patented Nov. 14, 1939

2,179,975

UNITED STATES PATENT OFFICE 2,179,975

COMPOSITION FOR PREPARING POLYSTYRENE FILMS

Edgar C. Britton, Midland, Mich., Harry Borden Marshall, Toronto, Ontario, Canada, and Clyde W. Davis, Midland, Mich., assignors to The Dow Chemical Company, Midland, Mich., a corporation of Michigan No Drawing. Application July 12, 1937, Serial No. 153,211

3 Claims. (Cl. 260—32)

The present invention relates to a new solvent for, and method of, preparing polystyrene films.

Transparent thin films of polystyrene, because of their stability against discoloration, good dielectric properties, and impermeability to moisture are desirable as wrapping materials, insulating tapes, etc. Such films are ordinarily prepared by dissolving polystyrene in a hydrocarbon solvent, spreading the solution onto a plate of glass or metal, allowing the solvent to evaporate, and then peeling or otherwise removing the resultant film from the plate. Unfortunately, however, polystyrene films prepared from the usual solvents, e. g., benzene, toluene, xylene, mixtures thereof, etc., frequently have a rough striated surface and tend to "blush", i. e., develop opaque areas. Furthermore, polystyrene films prepared from such usual solvents frequently adhere quite firmly to the surface upon which they are produced and can be removed only with difficulty and danger of tearing.

We have now discovered that a solvent suitable for use in preparing polystyrene films may be obtained by adding a small proportion of dioxan to any of the usual solvents capable of dissolving, or forming colloidal solutions of, polystyrene. Films of polystyrene produced from such solvent comprising dioxan are smooth, clear, and may readily be removed from glass or metal surfaces. The invention, then, consists in the solvent for, and method of, preparing polystyrene films hereinafter fully described and particularly pointed out in the claims.

Our new solvent for use in preparing polystyrene films is a mixture preferably containing about 97 per cent by volume of an aromatic hydrocarbon or nuclear chlorinated aromatic hydrocarbon and 3 per cent of dioxan although it may contain as little as 1 per cent or as much as 5 per cent of dioxan. A small proportion of other materials, e. g., dyes, inert diluents, etc., may also be present. When less than about 1 per cent of dioxan is employed, the beneficial effect of such material is greatly reduced, and when more than about 5 per cent is used, polystyrene films cast from the solvent tend to blush. Although any aromatic hydrocarbon or nuclear chlorinated aromatic hydrocarbon solvent, e. g., benzene, toluene, xylene, ethylbenzene, monochlorobenzene, dichlorobenzene, etc., or mixture thereof, may be employed in admixture with dioxan, the polystyrene film prepared from such mixture has a maximum of transparency and luster when a solvent with a moderately low rate of evaporation is chosen, xylene and monochlorobenzene have been found particularly suitable.

In preparing polystyrene films in accordance with the invention 5 to 20 parts, preferably 10 to 15 parts of polystyrene are dissolved in 100 parts of a hydrocarbon-dioxan mixture of the type described above. If desired, other materials, i. e., plasticizers, dyes, etc., may be added. Such solution may then be utilized to prepare polystyrene films in any of several ways. For instance, the solution may be spread upon a glass or metal plate, the solvent allowed to evaporate, and the film so produced peeled or otherwise removed from the plate. Alternatively, rolls may be dipped in the solution, allowed to drain, and then heated to evaporate the solvent, the film being thereafter removed from the rolls.

The following example illustrates one way in which the principle of the invention has been employed but is not to be construed as limiting the scope thereof:

Example

A solution was prepared by dissolving 20 parts by weight of polystyrene in 80 parts of a solvent containing 97 per cent by volume of xylene and 3 per cent of dioxan. This solution was spread on a glass plate and the solvent allowed to evaporate. A uniform film of polystyrene was obtained and was easily removed from the glass plate without tearing.

Other modes of applying the principle of the invention may be employed, change being made as regards the composition or method herein disclosed, provided the ingredients or steps stated by any of the following claims or the equivalent of such stated ingredients or steps be employed.

We therefore particularly point out and distinctly claim as our invention:

1. A composition for preparing polystyrene films which comprises polystyrene and a solvent consisting essentially of xylene and between about 1 and about 5 per cent of dioxan.

2. A composition for preparing polystyrene films which comprises polystyrene and a solvent consisting essentially of monochlorobenzene and between about 1 and about 5 per cent of dioxan.

3. A composition for preparing polystyrene films which comprises polystyrene and a solvent consisting essentially of an aromatic compound selected from the class consisting of aromatic hydrocarbons and chlorinated aromatic hydrocarbons, and between about 1 and about 5 per cent of dioxan.

EDGAR C. BRITTON.
HARRY BORDEN MARSHALL.
CLYDE W. DAVIS.